(12) United States Patent
Konno et al.

(10) Patent No.: US 8,159,522 B2
(45) Date of Patent: Apr. 17, 2012

(54) CAMERA UNIT

(75) Inventors: Georgero Konno, Kanagawa (JP); Makoto Usami, Kanagawa (JP)

(73) Assignee: Sony Corporation (JP)

( * ) Notice: Subject to any disclaimer, the term of this patent is extended or adjusted under 35 U.S.C. 154(b) by 1205 days.

(21) Appl. No.: 11/978,510

(22) Filed: Oct. 29, 2007

(65) Prior Publication Data

US 2008/0316293 A1 Dec. 25, 2008

(30) Foreign Application Priority Data

Oct. 30, 2006 (JP) ................. P2006-294589

(51) Int. Cl.
    *H04N 7/14* (2006.01)
(52) U.S. Cl. ................. 348/14.16; 348/14.01
(58) Field of Classification Search .......... 348/14.01, 348/14.02, 14.03, 14.07, 14.1, 14.16, E7.078
    See application file for complete search history.

(56) References Cited

U.S. PATENT DOCUMENTS 7,477,283 B2 * 1/2009 Rambo et al. ............. 348/14.16
7,808,540 B2 * 10/2010 Cok ........................... 348/14.16

FOREIGN PATENT DOCUMENTS

| JP | 05-199518 A | 8/1993 |
|----|-------------|--------|
| JP | 8-163416 A  | 6/1996 |
| JP | 11-225319 A | 8/1999 |
| JP | 2002-314899 A | 10/2002 |

\* cited by examiner

*Primary Examiner* — Brian Ensey
(74) *Attorney, Agent, or Firm* — Lerner, David, Littenberg, Krumholz & Mentlik, LLP

(57) ABSTRACT

There is provided a camera unit used in a communications system having a display section and arranged to exchange sound and images via communication between at least two locations. The camera unit includes a camera section having an image sensor for photoelectrically converting a visual image to an electric signal; a transparent filter section having signal lines for supplying power to the camera section and transferring the image signal supplied thereto from the camera section; a frame section for holding the transparent filter section therein, the frame section having a power input terminal for supplying power to the camera section and a video output terminal for outputting the image signal transferred thereto from the camera section; and attaching members for attaching the frame section holding the transparent filter section therein, to a front surface of a display screen of the display section of the communications system.

6 Claims, 4 Drawing Sheets

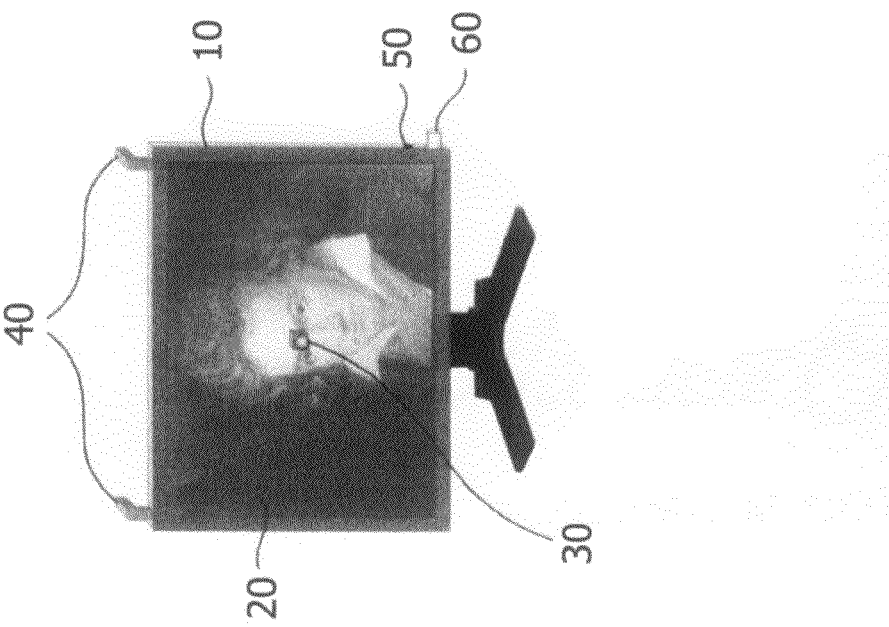
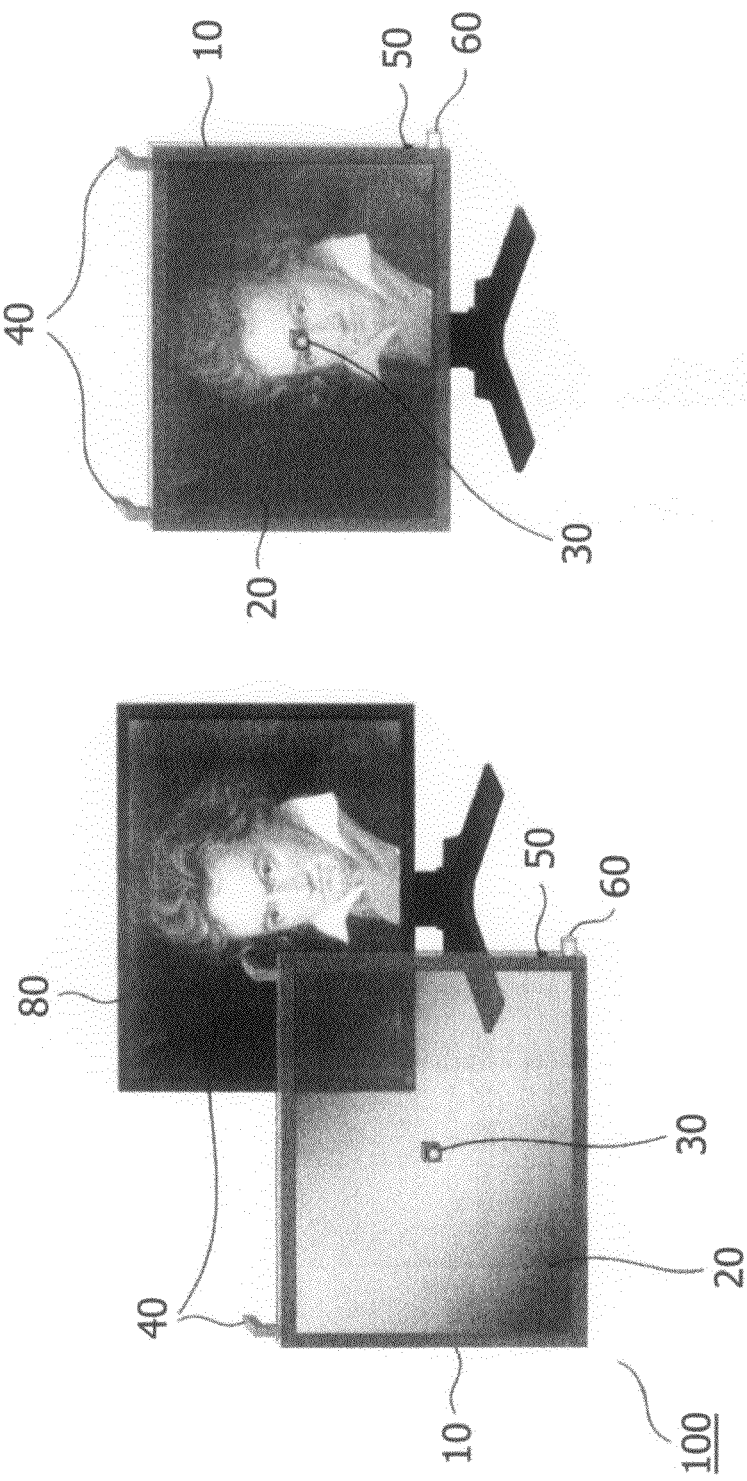

CAMERA UNIT

CROSS-REFERENCE TO RELATED APPLICATIONS

The present application claims priority from Japanese Patent Application No. JP 2006-294589, filed in the Japanese Patent Office on Oct. 30, 2006, the entire content of which is incorporated herein by reference.

BACKGROUND OF THE INVENTION

1. Field of the Invention

The present invention relates to a camera unit suitably applied to an imager section of, e.g., a videoconference system, and more particularly to a camera unit used in combination with a display section.

2. Description of Related Art

In recent years, videophones and videoconference systems have become popular which allows people to exchange not only sound but also images via communication. Such systems, enabling communicators to talk in real time while viewing each other's face displayed on a monitor, for example, provide an advantage of "realism" with which a person can have a conversation even with others in remote places.

However, if a camera section that takes an image of a communicator is attached atop a display section that displays video of the other communicator, a problem arises that their eyes do not meet, or they lose eye contact. Namely, when a communicator P1 sets his/her eyes in the middle of the display section, trying to view the other party (a communicator P2), an image of the communicator P1 in that position is taken diagonally from above. Meanwhile, on a screen the communicator P2 is viewing, video of the communicator P1 is displayed whose image is taken diagonally from above. If the communicator P1 wishes to send the communicator P2 an image in which the communicator P1 faces the front, i.e., with his/her eyes meeting with the eyes of the communicator P2, the communicator P1 needs to look up at the camera section. This, however, prevents the communicator P1 from looking at the display section.

In order to eliminate this situation that the eyes of the communicators do not meet, various techniques have been devised.

In Japanese Patent Application Publication (KOKAI) No. 2002-314899 (Patent Reference 1), a technique is disclosed in which an imaging apparatus is disposed on the back of a display device. Also, in Japanese Patent Application Publication (KOKAI) No. H05-199518 (Patent Reference 2), a videophone apparatus is disclosed in which a half mirror is used to allow eyes of communicators to meet each other.

SUMMARY OF THE INVENTION

By the way, as another technique known to eliminate losing of eye contact, a camera section is positioned in the middle of a display section with an arm. However, the arm itself blocks video displayed on the display section disposed therebehind, thereby making some communicators feel uncomfortable.

Meanwhile, as proposed in Patent Reference 1, arranging an imager section on the back of a display section can be a solution to the failure of communicators to make eye contact. However, this solution requires some additional machining work on the display section itself, such as providing a subject light receiving section on the display section in order to allow an image light of a subject (communicator) to enter into the imager section. Namely, a display section of new design need be fabricated, entailing investment in the development of a manufacturing process as well as in production facilities therefor, and hence imposing a problem of increasing the manufacturing cost. Another problem of increasing the size of the apparatus has also been imposed.

In addition, from this solution in which the imager section is disposed on the back of the display section, other problems have arisen that noise is introduced into an image signal due to the display section emitting light itself, and that sensitivity of the imager section is reduced due to the display section, conversely, blocking light incident onto the imager section. Even if image signal processing is performed to correct the noise and the sensitivity reduction, it has been difficult to completely correct these phenomena. Besides, the image signal processing has created new problems, such as signal delay.

Furthermore, as proposed in Patent Reference 2, the use of a half mirror is still another technique to eliminate losing of eye contact between communicators. However, this technique has imposed a problem that the depth of the display device is increased by an angle of inclination of the half mirror to limit the space for installing the apparatus.

In view of the above and other problems, it is desirable to provide inexpensively a camera unit capable of allowing a communicator to communicate with the other party with making eye contact and thus comfortably, in a bidirectional communications system such as a videoconference system.

In one embodiment of the present invention, there is provided a camera unit used in a communications system for exchanging sound and images via communication between at least two locations. The camera unit includes a camera section having an image sensor for photoelectrically converting a visual image to an electric signal, and a transparent filter section having signal lines for supplying power to the camera section and transferring the image signal supplied thereto from the camera section. The transparent filter section is held by a frame section. The frame section has a power input terminal for supplying power to the camera section and a video output terminal for outputting the image signal produced at the camera section. The camera unit also has attaching members for attaching the frame section holding the transparent filter section therein, to a front surface of a display screen of the display section of the communications system.

With this configuration, the camera section is disposed as superposed on the display section of the communications system, and also a wiring of the camera section is patterned on a transparent conductive film. Accordingly, there is nothing other than the camera unit that blocks the vision of a user.

In addition, it is configured such that the camera unit having the camera section is attached to the display section. Accordingly, there is no need to give additional mechanical work on the camera section itself nor on the display section itself, which hence eliminates the need for investment in the development of a new manufacturing process as well as in production facilities therefor.

These and other features and aspects of the invention are set forth in detail below with reference to the accompanying drawings in the following detailed description of the embodiments.

BRIEF DESCRIPTION OF THE DRAWINGS

FIG. 1 is a diagram illustrating a configuration example of a camera unit according to an embodiment of the present invention;

DETAILED DESCRIPTION OF THE EMBODIMENT

Figure 2:
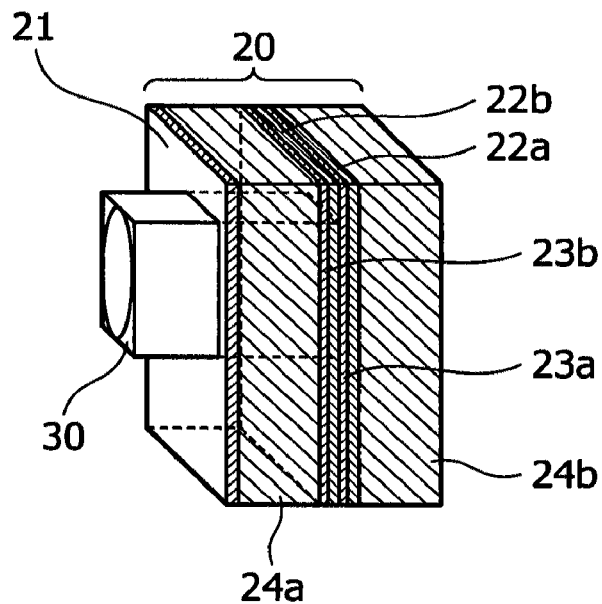
FIG. 2 is a sectional view showing a configuration example of a transparent filter section according to the embodiment of the present invention.

An embodiment of the present invention will be described below with reference to FIGS. 1 through 6. FIG. 1 illustrates examples in which a camera unit according to the present embodiment is attached to and detached from a display section such as a monitor. FIG. 1A shows an example in which a camera unit 100 is detached from a monitor 80, and FIG. 1B shows an example in which the camera unit 100 is attached to the monitor 80.

In FIGS. 1A and 1B, the camera unit 100 includes a camera module 30 (camera section) for taking an image of a user being a communicator, a transparent filter section 20 having signal lines of the camera module 30 patterned therein, a frame 10 for holding the transparent filter section 20, a power input terminal 50 for supplying power to the signal lines in the transparent filter section 20, a video output terminal 60 for outputting an image signal transferred thereto via the signal lines, and hooks 40 (attaching members) for attaching the camera unit onto the monitor 80. Both the power input terminal 50 and the video output terminal 60 are disposed at a lower portion of the frame 10, as shown in FIGS. 1A and 1B.

A configuration example of the transparent filter section 20 will be described next with reference to a sectional perspective view of FIG. 2. In FIG. 2, the left-hand side is a user side, and the right-hand side is a monitor side. Transparent materials are used for layers forming the transparent filter section 20.

A forefront layer of the transparent filter section 20, i.e., a layer on the user side, is formed of a low-reflective coating member 21. For this reason, the mirroring of the user and other subjects on and reflections from the monitor 80 are reduced, thereby facilitating the user to read a facial expression of the other party. Note that the low-reflective coating member 21 is supposed to be formed of a single or a plurality of layers of magnesium fluoride. With this configuration, it becomes possible to prevent reflections over a wide visible range. Furthermore, a hard coating layer and an antifouling coating layer may be laminated on top or bottom of the low-reflective coating member 21 for the above purpose. This configuration can additionally suppress the adhesion of fingerprints and the occurrence of damages.

Layers in the middle of the transparent filter section 20 are formed by stacking resin film substrates 22a and 22b one upon another. The resin film substrate 22a has a first conductive film 23a coated or evaporated thereon, and the resin film substrate 22b has a second conductive film 23b coated or evaporated thereon. An ITO (Indium Tin Oxide) conductive film is used for the first and second conductive films 23a and 23b, whereas a polyester film is used for the resin film substrates 22a and 22b.

The first conductive film 23a and the resin film substrate 22b on which the second conductive film 23b is evaporated are flanked, on the left side and on the right side, by resin plates 24a and 24b, respectively. The resin plates 24a and 24b are provided as structures for maintaining the rigidity of the transparent filter section 20 as a whole, and are made of a polycarbonate.

The signal lines of the camera module 30 are patterned on the first conductive film 23a, so that the camera module 30 is electrically connected onto the signal lines of the first conductive film 23a. In FIG. 2, a portion of the camera module 30 accommodated in the transparent filter section 20 is shown by dashed lines, indicating that the camera module 30 is connected to the first conductive film 23a. The second conductive film 23b arranged frontward of, i.e., nearer to the user side than, the first conductive film 23a, is a layer for blocking electromagnetic waves radiated from the first conductive film 23a. This second conductive film 23b is provided for EMC (Electro-Magnetic Compatibility). Details of the first and second conductive films 23a and 23b will be described later.

For connection of the first conductive film 23a being a conductive film for the signal lines to the camera module 30, an opening of a size corresponding to the camera module 30 is provided in each of layers, starting with the user-side, forefront layer down to a layer preceding the first conductive film 23a, among the layers forming the transparent filter section 20. In other words, the term "the user-side, forefront layer" means the low-reflective coating member 21, and a camera module attaching opening 25 is provided in each of the low-reflective coating member 21, the resin plate 24a, the second conductive film 23b, down to the resin film substrate 22b. Note that a position for attaching the camera module 30 is supposed to be pre-adjusted so as to eliminate losing of eye contact between communicators.

Figure 3:
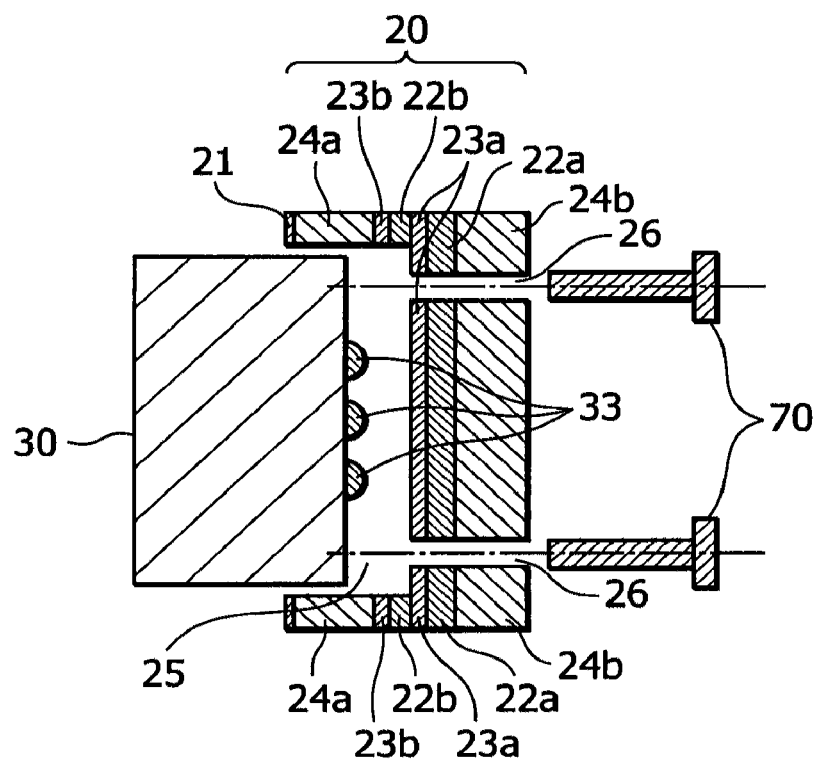
FIG. 3 is a sectional view showing an example of how a camera module is attached according to the embodiment of the present invention.

FIG. 3 is a diagram showing an example of how the camera module 30 is attached to the transparent filter section 20. FIG. 3 shows that the camera module attaching opening 25 is provided in each of the low-reflective coating member 21, the resin plate 24a, the second conductive film 23b, and the resin film substrate 22b. The camera module 30 is connected to the first conductive film 23a through the camera module attaching openings 25. Connection between the camera module 30 and the first conductive film 23a is electrically implemented via terminals 33 (metallic contacts) arranged on the back of the camera module 30.

In order to fix the connection between the camera module 30 and the first conductive film 23a, camera module fixing screws 70 are screwed into the camera module 30 from the back of the transparent filter section 20 via throughholes 26 provided in the transparent filter section 20. Although the camera module 30 and the transparent filter section 20 are fixed using the screws in this example, they may alternatively be fixed using other means such as an adhesive.

Figure 4:
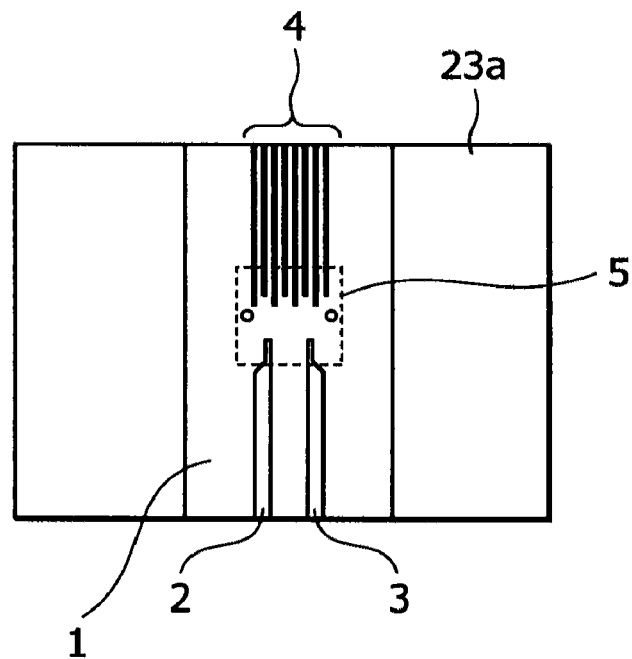
FIG. 4 is a diagram illustrating a circuit configuration example of a conductive film for signals according to the embodiment of the present invention.

An example of wiring patterns on the first conductive film 23a as a conductive film for the signal lines will be described next with reference to FIG. 4. A portion shown by dashed lines in FIG. 4 is a camera module attaching position 5, where the camera module 30 is to be attached. A data input/output pattern 4 for input/output of data to/from the camera module 30 is laid out above the camera module attaching position 5, whereas a GND (ground) pattern 2 and a Vcc (power supply) pattern 3 are laid out below the position 5. Further, in an area where these wiring patterns are arranged is an interference prevention GND pattern 1 for preventing interference with other parts.

Figure 5:
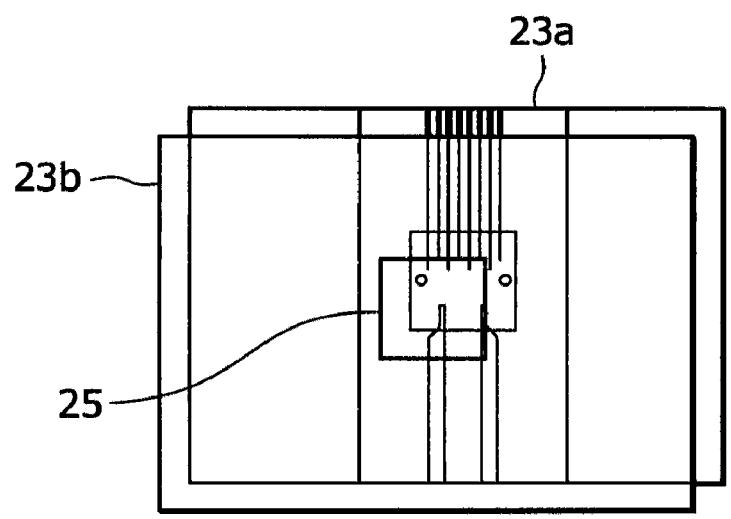
FIG. 5 is a diagram illustrating a layout example of conductive films according to the embodiment of the present invention.

FIG. 5 shows an example of a case where the second conductive film 23b is stacked on the first conductive film 23a shown in FIG. 4. In FIG. 5, the second conductive film 23b is provided with the camera module attaching opening 25. Thus, the camera module 30 is connected to the first conductive film 23a through the camera module attaching opening 25 provided in the second conductive film 23b. Further, the second conductive film 23b has its entire part grounded so as to block electromagnetic waves generated at the first conductive film 23a for the signal lines.

Figure 6:
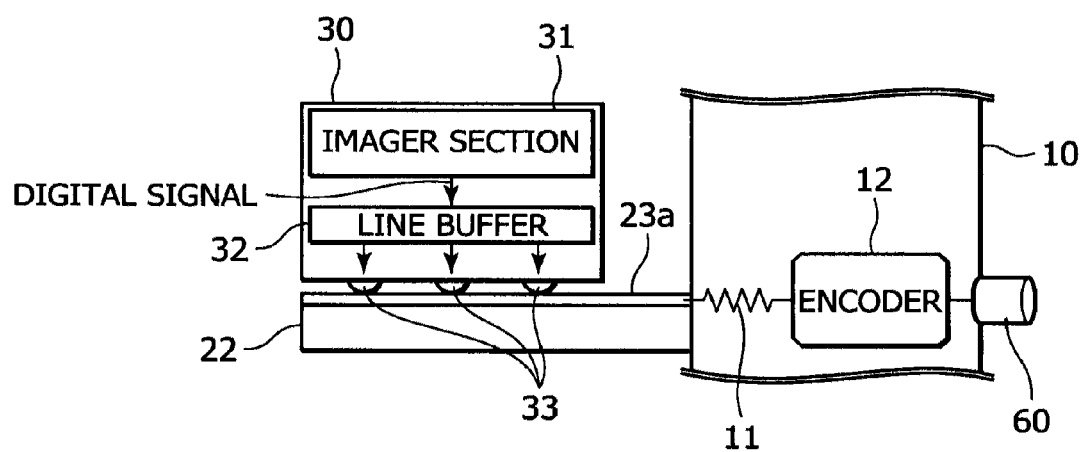
FIG. 6 is a diagram illustrating a circuit configuration example according to the embodiment of the present invention.

A configuration example of the camera module 30 will be described next with reference to FIG. 6. The camera module 30 includes an imager section 31 formed by attaching a lens, not shown, to a CCD (Charge Coupled Device) or CMOS (Complementary Metal-Oxide Semiconductor) imager, and a line buffer 32 for amplifying an image signal produced by the imager section 31 and outputting the amplified image signal. The imager section 31 uses a small-sized camera module applied to a portable telephone and the like. An image signal subjected to photoelectric conversion at the imager section 31 is transferred along the signal lines patterned on the first conductive film 23a. Since a transparent conductive film such as an ITO conductive film has a large electric resistance value, the level of a signal to be transferred through the transparent conductive film needs to be large. This is why the image signal outputted from the imager section 31 is amplified by the line buffer 32.

The image signal amplified by the line buffer 32 is transferred to the frame 10 via the signal lines on the first conductive film 23a. The frame 10 includes a damping resistor 11 for shaping an output waveform of the image signal transferred thereto via the first conductive film 23a, an encoder 12 for converting the image signal shaped by the damping resistor 11 into a video signal compliant with an NTSC (National Television Standards Committee) or a PAL (Phase Alternating Line) system, and the video output terminal 60 for outputting the video signal converted by the encoder 12. The frame 10 also has the power input terminal 50 (see FIG. 1) for supplying power to the camera module 30 via the first conductive film 23a.

In this example, in order to make the camera module 30 as small as possible, the encoder 12 is provided inside the frame 10, not inside the camera module 30. For this reason, the camera module 30 is configured to output a digital signal according to a format, such as BT.656, which is an input format to the encoder 12, via an analog/digital converting section and an analog signal processing section, both of which are not shown, within the imager section 31. Note that the digital signal may be encoded in any of other formats such as REC.656 and YUV.422.

By having a digital signal outputted from the imager section 31 in this way, it is possible to dispose the encoder 12, not inside the imager section 31, but inside the frame 10. As a result, the imager section 31 can be miniaturized, and the camera module 31 with the imager section 31 can also be miniaturized. In this example, the camera module 30 is the only one object that blocks the vision of the user. Thus, by minimizing the sectional area of the module 30, the user is allowed to communicate with the other party without feeling uncomfortable.

Furthermore, since the image signal outputted from the imager section 31 is amplified by the line buffer 32, the image signal can be transferred even on the transparent conductive film having a large resistance value.

Furthermore, since the camera module applied to a portable telephone and the like is used as the imager section 31, the manufacturing cost can be reduced.

Furthermore, since the second conductive film 23b for blocking electromagnetic waves generated at the first conductive film 23a is provided frontward of the first conductive film 23a being a conductive film for the signal lines, problems, such as the first conductive film 23a inducing other circuits near itself into erroneous operation and the film 23a being affected by electromagnetic waves generated at the other circuits, are less likely to occur.

Furthermore, since transparent materials are used in all the layers forming the transparent filter section 20, the user can view the other party as what he or she is in video displayed on the monitor 80 (see FIG. 1). Thus, the user can concentrate on a conversation with the other party, and can hence communicate with the other party smoothly.

Furthermore, since the camera module 30 is disposed on the transparent filter section 20, by aligning the camera module 30 with the line of sight of a communicator, the problem of losing eye contact between the communicators can be eliminated.

Furthermore, since the camera module 30 is arranged on the front of the monitor 80, subject light, or a visual image, directly enters into the camera module 30. Accordingly, a possibility will be reduced that noise and the like occur in an image signal produced by the imager section 31 of the camera module 30 as is the case with the monitor 80 arranged on the back of the camera module 30.

In this case, image signal processing need not be performed to remove noise derived from mirroring on the display section or from emission of light from the display section itself. Hence, signal delay and the like possibly caused by special image signal processing may not occur.

Note that the example in which an ITO conductive film is used for the first and second conductive films has been described in the embodiment so far disclosed. However, a film made of a different material may also be used, as long as the film is a transparent conductive film.

Furthermore, while the example in which a polyester film is used for the resin film substrates and a polycarbonate is used for the resin plates has been described in the above-mentioned embodiment, other materials, such as glass or resins other than polycarbonates may alternatively be used, as long as they have transparency.

Furthermore, while the configuration in which hooks are used to attach the camera unit onto the display section has been described in the above-mentioned embodiment, the camera unit may alternatively be attached with an adhesive or other means.

According to the embodiment of the present invention, it is possible to realize communication with eye contact between communicators, inexpensively, in a bidirectional communications system such as a videoconference system.

It should be understood by those skilled in the art that various modifications, combinations, sub-combinations and alterations may occur depending on design requirements and other factors insofar as they are within the scope of the appended claims or the equivalents thereof.

The invention claimed is:

1. A camera unit used in a communications system having a display section and arranged to exchange sound and images via communication between at least two locations, the camera unit comprising:

a camera section having an image sensor for photoelectrically converting an visual image to an electric signal;

a transparent filter section having signal lines for supplying power to the camera section and transferring the image signal supplied thereto from the camera section;

a frame section for holding the transparent filter section therein, the frame section having a power input terminal for supplying power to the camera section and a video output terminal for outputting the image signal transferred thereto from the camera section; and attaching members for attaching the frame section holding the transparent filter section therein, to a front surface of a display screen of the display section of the communications system.

2. The camera unit according to claim 1, wherein the transparent filter section has a first conductive section having the signal lines, and a second conductive section arranged frontward of the first conductive section to block electromagnetic waves generated at the first conductive section.

3. The camera unit according to claim 2, wherein the first conductive section and the second conductive section are held as interposed between first and second transparent plates.

4. The camera unit according to claim 1, wherein a low-reflective coating member having a low-reflective coating thereon is arranged on a front side of the transparent filter section.

5. The camera unit according to claim 1, wherein the camera section has an amplifying section for amplifying the image signal outputted from the image sensor.

6. The camera unit according to claim 5, wherein the frame section has an encoder for converting the image signal outputted from the camera section into a predetermined video signal format.

* * * * *